US011313022B2

(12) United States Patent
Yoshinaga et al.

(10) Patent No.: US 11,313,022 B2
(45) Date of Patent: Apr. 26, 2022

(54) METHOD FOR MANUFACTURING SOFT MAGNETIC MEMBER

(71) Applicant: TOYOTA JIDOSHA KABUSHIKI KAISHA, Toyota (JP)

(72) Inventors: Fumitaka Yoshinaga, Toyota (JP); Kazuaki Haga, Toyota (JP); Seishi Utsuno, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/689,643

(22) Filed: Nov. 20, 2019

(65) Prior Publication Data

US 2020/0224302 A1 Jul. 16, 2020

(30) Foreign Application Priority Data

Jan. 11, 2019 (JP) .............................. JP2019-003661

(51) Int. Cl.
*C23C 8/18* (2006.01)
*H01F 1/34* (2006.01)
(Continued)

(52) U.S. Cl.
CPC ................ *C23C 8/18* (2013.01); *C01G 49/06* (2013.01); *H01F 1/344* (2013.01); *H02K 1/02* (2013.01); *C01P 2002/72* (2013.01)

(58) Field of Classification Search
CPC ......... C23C 8/18; C23C 18/1682; C23C 8/16; C23C 8/10; C22C 45/02; C22C 1/002; C22C 1/02; C22C 38/002; C22C 38/08; C22C 45/008; C22C 8/16; C01G 49/06; H01F 1/344; H01F 1/15383; H01F 41/026; H02K 1/02; C01P 2002/72; (Continued)

(56) References Cited

U.S. PATENT DOCUMENTS 5,439,534 A * 8/1995 Takeuchi ............ H01F 1/15341
148/105
9,175,376 B2 * 11/2015 Fujihara ................ H01F 41/026
(Continued)

FOREIGN PATENT DOCUMENTS

EP 0527233 A1 2/1993
JP S58193303 A 11/1983
(Continued)

OTHER PUBLICATIONS

The MAC Humidity/Moisture Handbook, MAC Instruments, 1999-2019 (Year: 2018).*

*Primary Examiner* — John A Hevey
(74) *Attorney, Agent, or Firm* — Dickinson Wright, PLLC

(57) ABSTRACT

There is provided a method for manufacturing a soft magnetic member where a coating formed of an $\alpha\text{-Fe}_2\text{O}_3$ single phase having a high electrical resistivity is formed on a soft magnetic alloy substrate. A soft magnetic alloy substrate is heated in an atmosphere containing water vapor and inert gas to form a coating on the soft magnetic alloy substrate. The atmosphere has an oxygen partial pressure in a range of 0 to 1.5 kPa. A soft magnetic member including the soft magnetic alloy substrate and the coating formed on its surface can be obtained.

3 Claims, 2 Drawing Sheets

(51) Int. Cl.
  *C01G 49/06* (2006.01)
  *H02K 1/02* (2006.01)
(58) Field of Classification Search
  CPC .. B22D 11/0611; C21D 2201/03; C21D 1/76; C21D 1/773; C21D 8/12; C21D 8/1244
  See application file for complete search history.

(56) References Cited

U.S. PATENT DOCUMENTS

| | | |
|---|---|---|
| 2010/0271158 A1 | 10/2010 | Hoshina et al. |
| 2013/0098509 A1* | 4/2013 | Fujihara ................ H01F 1/0536 148/287 |
| 2015/0364234 A1* | 12/2015 | Nagata .................... C22C 38/02 419/28 |
| 2016/0079455 A1 | 3/2016 | Hatano et al. |

FOREIGN PATENT DOCUMENTS

| | | |
|---|---|---|
| JP | H5-82373 A | 4/1993 |
| JP | 2005-310975 A | 11/2005 |
| JP | 2011-149045 A | 8/2011 |
| JP | 2014-218728 A | 11/2014 |

\* cited by examiner

METHOD FOR MANUFACTURING SOFT MAGNETIC MEMBER

CROSS REFERENCE TO RELATED APPLICATIONS

The present application claims priority from Japanese patent application JP 2019-003661 filed on Jan. 11, 2019, the content of which is hereby incorporated by reference into this application.

BACKGROUND

Technical Field

The present disclosure relates to a method for manufacturing a soft magnetic member.

Background Art

An electromagnetic steel plate is used as a soft magnetic material in a core of a motor. To further improve the energy efficiency of the motor, it is examined to use an alloy ribbon as the soft magnetic material. It is necessary to coat a surface of the alloy ribbon with an insulating film to avoid mutual conduction of the alloy ribbons.

JP H05-082373 A discloses that a coating having a good weather resistance is formed by heat-treating a soft magnetic alloy ribbon under nitrogen atmosphere containing water vapor. JP 2011-149045 A discloses a soft magnetic alloy ribbon having an oxide film on a surface. It is also disclosed that, in a method for manufacturing the soft magnetic alloy ribbon, an initial microcrystalline alloy ribbon is heat-treated in an atmosphere having an oxygen concentration of 6 to 18%. JP 2014-218728 A discloses that, in a method of producing a stainless steel substrate for solar cell, a stainless steel is subjected to a heat treatment in an atmosphere containing water vapor to form an oxide film having a superior insulation property on a surface of the stainless steel. JP 2005-310975 A discloses that a sintered neodymium magnet is heated to a predetermined temperature under a water-vapor atmosphere to form an oxide layer containing $Fe_3O_4$ and $Fe_2O_3$ on a surface of the sintered neodymium magnet.

SUMMARY

A motor is desired to be reduced in size. For this purpose, it is necessary to increase a space factor of a core of the motor. However, the soft magnetic alloy ribbon has a small thickness. Thus, to increase the space factor, it is necessary to decrease a thickness of an insulating film formed on a surface of the soft magnetic alloy ribbon. To decrease the thickness of the insulating film while maintaining its insulation property, it is necessary to further increase an electrical resistivity of the insulating film.

However, as a result of an intensive examination by the inventors, it was found that the coatings formed by the methods disclosed in JP H05-082373 A, JP 2011-149045 A, JP 2014-218728 A, and JP 2005-310975 A contain at least one of FeO or $Fe_3O_4$ having a low electrical resistivity.

The present disclosure provides a method for manufacturing a soft magnetic member where a single-phase $\alpha$-$Fe_2O_3$ film (i.e. a coating formed of an $\alpha$-$Fe_2O_3$ single phase) having a high electrical resistivity is formed on a soft magnetic alloy substrate.

According to one aspect of the present disclosure, there is provided a method for manufacturing a soft magnetic member. The method includes heating a soft magnetic alloy substrate in an atmosphere containing water vapor and inert gas to form a coating on the soft magnetic alloy substrate. The atmosphere has an oxygen partial pressure in a range of 0 to 1.5 kPa.

The soft magnetic member manufactured by the manufacturing method of the present disclosure has the coating formed of the $\alpha$-$Fe_2O_3$ single phase having the high electrical resistivity. This soft magnetic member enables reduced size of the motor by an increase in the space factor, and improvement in the energy efficiency of the motor.

DETAILED DESCRIPTION

Figure 1:
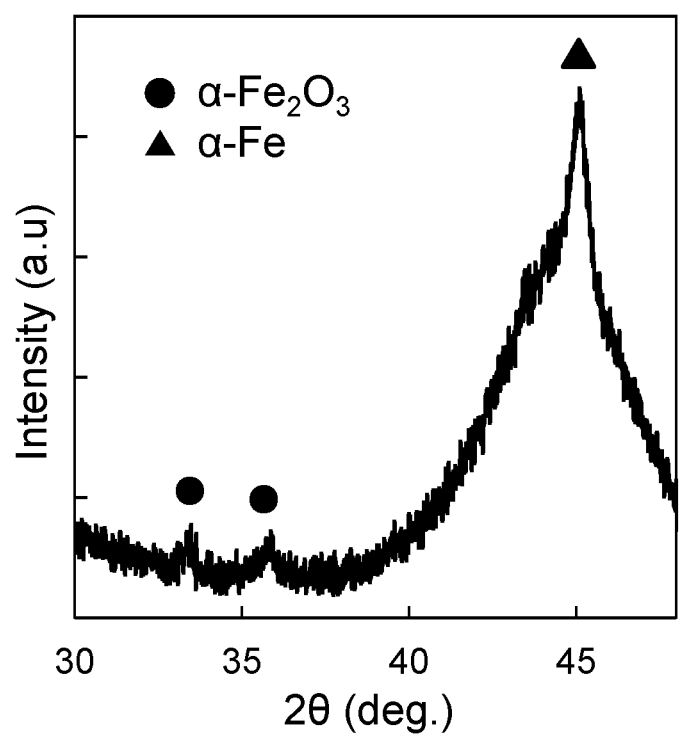
FIG. 1 is an XRD pattern of a sample in Example 1.

An embodiment of a method for manufacturing a soft magnetic member will be specifically described.

First, a soft magnetic alloy substrate is prepared. The soft magnetic alloy substrate can be obtained by, for example, melting metal raw materials combined to have a desired composition at a high temperature with a high frequency melting furnace or the like to make a uniform molten metal and rapidly cooling this uniform molten metal. The soft magnetic alloy substrate after the rapid cooling may be amorphous. Furthermore, the soft magnetic alloy substrate may be heated to crystallize the amorphous phase, thus forming a nanocrystal. The amorphous phase may be crystallized into the nanocrystals during heating for coating formation, which is described later. A form of the soft magnetic alloy substrate is not especially limited, for example, may be a form of a ribbon, a flake, a granular matter, or a bulk, and may be the form of the ribbon in some embodiments.

The soft magnetic alloy substrate is a substrate made of a Fe base alloy. The "Fe base alloy" means an alloy containing Fe as a main component. Here, "containing Fe as a main component" means that a content of the Fe in the alloy is 50 at % or more. The content of Fe in the Fe base alloy may be 80 at % or more, 84 at % or more, or 88 at % or more in some embodiments from a perspective of the soft magnetic member manufactured by the manufacturing method of the embodiment having a high saturation magnetization.

The Fe base alloy contains an element required for accelerating amorphous formation (at least one kind of metalloid element selected from the group of B, Si, P, and the like) with a minimum required amount in addition to Fe. The Fe base alloy containing such an element allows the soft magnetic alloy substrate obtained after the rapid cooling from the molten metal being amorphous.

Furthermore, the Fe base alloy may contain an element M as necessary. The M is at least one kind of metal selected from the group of Nb, Mo, Ta, W, Cu, Ni, Co, and Sn.

When the M is at least one kind of metal selected from a group of Nb, Mo, Ta, W, and Sn, a growth of crystal grains by heat treatment for the soft magnetic alloy substrate is suppressed to suppress increase in coercivity and stabilize the amorphous phase that remains after the heat treatment. The Fe base alloy containing such an element has a high nucleation frequency during the heat treatment. When the M is Cu, the heat treatment for the soft magnetic alloy substrate causes heterogeneous nucleation starting from a Cu clusters, thus forming fine crystal grains. Even when a content of Cu in the Fe base alloy is negligible, an effect of forming fine crystal grains is relatively large. However, the Fe base alloy containing such an element decreases the content of Fe, thus reducing the saturation magnetization. Accordingly, content of such an element in the Fe base alloy are minimum necessary in some embodiments.

When the M is at least one kind of Ni or Co, a magnitude of an induced magnetic anisotropy is controllable. When the M is Ni, the saturation magnetization can be increased.

When the Fe base alloy contains the M, the above-described action can be provided by the content of the M. That is, each of Nb, Mo, Ta, W, and Sn provides the action of suppressing the crystal grain growth and stabilizing the amorphous phase, Cu provides the action of refining the crystal grains, and Ni and Co provide the action of controlling the magnitude of the induced magnetic anisotropy and increasing the saturation magnetization.

The prepared soft magnetic alloy substrate is heated in an atmosphere containing water vapor and inert gas. This forms a coating on the soft magnetic alloy substrate. The inert gas includes nitrogen, Argon, helium, or the like, and is nitrogen in some embodiments. The atmosphere may have a dew point of 20 to 25° C. That is, a water vapor partial pressure in the atmosphere may be 2.3 to 3.2 kPa. An oxygen partial pressure in the atmosphere is 0 to 1.5 kPa. The atmosphere containing no oxygen or having an oxygen partial pressure of 1.5 kPa or less even if the atmosphere contains oxygen allows the coating formed on a surface of the soft magnetic alloy substrate by heating to be a single-phase $\alpha$-$Fe_2O_3$ film. The oxygen partial pressure in the atmosphere may be 0 to 0.1 kPa, which allows the coating to have a higher insulation property. From the aspect of further improving the insulation property of the coating, the oxygen partial pressure in the atmosphere may be 0 to 0.01 kPa. The total pressure of the atmosphere may be an atmospheric pressure. It is noted that when the atmosphere in the furnace that heats the soft magnetic alloy substrate is changed to a nitrogen atmosphere, for example, by a nitrogen purge, it is not usual that the oxygen partial pressure in the furnace becomes 1.5 kPa or less. Repeating vacuum-pumping (deairing) and nitrogen introduction in the furnace multiple times can make the oxygen partial pressure in the furnace 0 to 1.5 kPa, 0 to 0.1 kPa, or 0 to 0.01 kPa in some embodiments.

The heating of the soft magnetic alloy substrate may be performed in an atmosphere substantially containing only water vapor and inert gas. Here, "substantially containing only water vapor and inert gas" encompasses containing components other than water vapor and inert gas in a quantity to the extent that does not influence reaction.

A heating temperature may be, for example, 250 to 450° C. A heating period may be appropriately set corresponding to a thickness of the coating to be formed.

As described above, the soft magnetic member including the soft magnetic alloy substrate and the coating formed on the surface of the substrate is obtained. The formed coating is the single-phase $\alpha$-$Fe_2O_3$ film. The "single-phase $\alpha$-$Fe_2O_3$ film" means a film that contains $\alpha$-$Fe_2O_3$ and does not substantially contain another iron oxide phase. "Not substantially containing another iron oxide phase" means that another iron oxide phase is not detectable by an instrumental analysis such as an XRD.

The iron oxide has phases of $Fe_3O_4$, FeO, and the like in addition to the $\alpha$-$Fe_2O_3$ phase. The $\alpha$-$Fe_2O_3$ has a high electrical resistivity of about $10^6$ $\Omega \cdot cm$, while the electrical resistivities of $Fe_3O_4$ and FeO are each about $10^{-3}$ $\Omega \cdot cm$, which are lower than the electrical resistivity of the $\alpha$-$Fe_2O_3$. As described above, the coating formed by the manufacturing method of the embodiment contains the $\alpha$-$Fe_2O_3$ having the high electrical resistivity and does not substantially contain the iron oxide phases of the $Fe_3O_4$, the FeO, and the like having the low electrical resistivities, thus having the high electrical resistivity. Therefore, even when the thickness of the coating is small, the coating can have the high insulation property. Accordingly, the core having a high space factor can be formed by using the manufactured soft magnetic member.

The inventors consider a reason why the single-phase $\alpha$-$Fe_2O_3$ film is formed by the manufacturing method of the embodiment is that a low content of the oxygen in the atmosphere allows the iron oxide to be formed through hydroxide. The inventors consider that, when the oxygen partial pressure in the atmosphere exceeds 1.5 kPa, a difference occurs between the rate of Fe diffusion from the soft magnetic alloy substrate and the rate of oxygen diffusion from the atmosphere during the heating, which results in the coating formed of the iron oxide phases of the $Fe_3O_4$, the FeO, and the like.

The manufactured soft magnetic member can be used as a core of a component such as a motor and a reactor.

While the embodiment of the present disclosure has been described in detail above, the present disclosure is not limited thereto, and can be subjected to various kinds of changes in design without departing from the spirit and scope of the present disclosure described in the claims.

EXAMPLES

The following specifically describes the present disclosure with Examples and Comparative Examples, but the present disclosure is not limited to these examples.

Example 1

(1) Manufacture of Soft Magnetic Alloy Substrate

Raw materials (Fe, B and Ni) were weighted to have a composition of $Fe_{84}B_{12}Ni_3$ to be melted by arc melting and mixed. To achieve a homogeneous mixture, the melting was repeated four times while inverting the mixture. After the mixing, an alloy ingot was manufactured by casting.

The manufactured alloy ingot was cut into a size which allows the cut ingot can be charged into a quartz nozzle (a discharge hole diameter ($\varphi$) of 0.5 mm). The cut ingot was then charged into the quartz nozzle to be installed on a liquid quenching device (using a single roll method) and melted by high-frequency heating in an inert atmosphere. Thus, the molten metal was obtained. The molten metal was discharged to a copper roll rotating with a peripheral velocity of 60 m/s. Thus, a soft magnetic alloy ribbon (the soft magnetic alloy substrate) having a width of 1 mm and a thickness of 13 μm was manufactured. A distance between the quartz nozzle and the copper roll was set at 0.4 mm, a molten metal discharging temperature was set at a melting point +100° C., and a pressure difference at the time of the discharging was set at 60 kPa.

(2) Formation of Coating

The manufactured soft magnetic alloy ribbon was placed in a treatment furnace. After the furnace was vacuum-pumped to 5 Pa, a mixed gas of the water vapor and the nitrogen was introduced into the furnace, and an oxygen concentration in the furnace was measured with an oxygen concentration meter (SH-2D manufactured by NGK INSULATORS, LTD.). The vacuum-pumping and the mixed gas introduction were repeated until the oxygen concentration became 0.01%. The total pressure in the furnace was set to the atmospheric pressure. Next, while the mixed gas of the water vapor and the nitrogen was flowed through the furnace with keeping the atmospheric pressure inside the furnace, the soft magnetic alloy ribbon was heated at 300° C. for 120 minutes. The oxygen concentration during the heating was 0.01%, and a dew point was 24.1° C. They were each approximately constant. Respective partial pressures of the nitrogen, the water vapor, and the oxygen during the heating were as shown in Table 1. The water vapor partial pressure is a value obtained in accordance with Japanese Industrial Standard Z 8806.

(3) Evaluation for Sample

An XRD pattern of an obtained sample is illustrated in FIG. 1. A peak of α-Fe derived from the soft magnetic alloy ribbon and a peak of the $\alpha\text{-}Fe_2O_3$ derived from the coating formed on the soft magnetic alloy ribbon were observed. No peak of the iron oxide of the phase other than the $\alpha\text{-}Fe_2O_3$ was observed. This confirmed formation of the coating formed of the $\alpha\text{-}Fe_2O_3$ single phase having the high electrical resistivity.

Example 2

A sample was manufactured similarly to Example 1 except that the vacuum-pumping and the mixed gas introduction into the treatment furnace were repeated until the oxygen concentration meter shows 0.1% and the soft magnetic alloy ribbon was heated at 300° C. for 180 minutes. The oxygen concentration during the heating was 0.1%, and the dew point was 24.1° C. They were each approximately constant. Respective partial pressures of the nitrogen, the water vapor, and the oxygen during the heating were as shown in Table 1. It was confirmed that the coating formed of the $\alpha\text{-}Fe_2O_3$ single phase was formed, from an XRD pattern of the manufactured sample.

Example 3

A sample was manufactured similarly to Example 1 except that the vacuum-pumping and the mixed gas introduction into the treatment furnace were repeated until the oxygen concentration meter shows 1% and the soft magnetic alloy ribbon was heated at 400° C. for 10 minutes. The oxygen concentration during the heating was 1%, and the dew point was 24.1° C. They were each approximately constant. Respective partial pressures of the nitrogen, the water vapor, and the oxygen during the heating were as shown in Table 1. It was confirmed that the coating formed of the $\alpha\text{-}Fe_2O_3$ single phase was formed, from an XRD pattern of the manufactured sample.

Comparative Example 1

Figure 2:
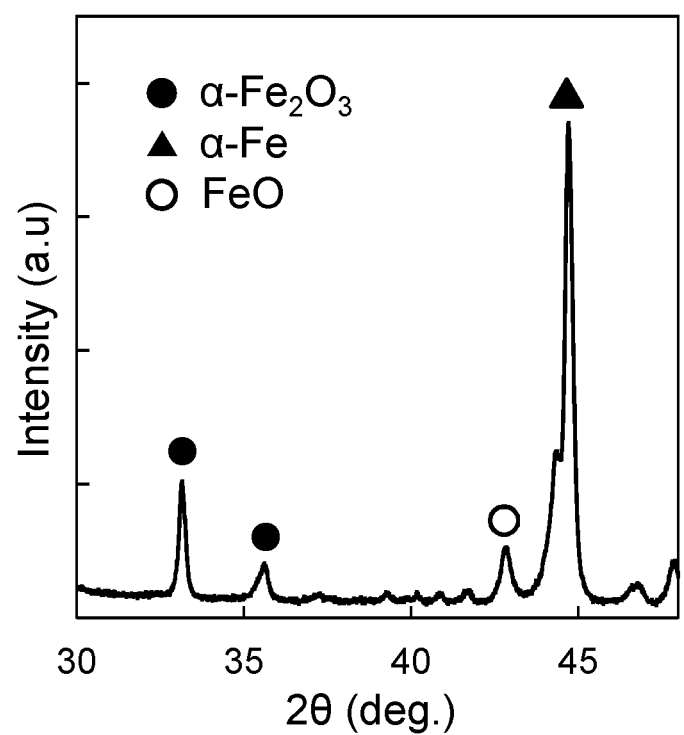
FIG. 2 is an XRD pattern of a sample in Comparative Example 1.

A sample was manufactured similarly to Example 1 except that the soft magnetic alloy ribbon was heated at 450° C. for 180 minutes in an air atmosphere without the vacuum-pumping or the mixed gas introduction into the treatment furnace. The oxygen concentration during the heating was 18%, and the dew point was 14° C. They were each approximately constant. Respective partial pressures of the nitrogen, the water vapor, and the oxygen during the heating were as shown in Table 1. An XRD pattern of the manufactured sample is illustrated in FIG. 2. The peak of the FeO was also observed in addition to the peak of the α-Fe derived from the soft magnetic alloy ribbon and the peak of the $\alpha\text{-}Fe_2O_3$ derived from an oxide film formed on the soft magnetic alloy ribbon. This confirmed formation of the coating containing a FeO phase having the low electrical resistivity.

Comparative Example 2

A sample was manufactured similarly to Example 1 except that oxygen was introduced into the treatment furnace after the vacuum-pumping and the soft magnetic alloy ribbon was heated at 450° C. for 180 minutes while the oxygen was flowed through the treatment furnace. Respective partial pressures of the nitrogen, the water vapor, and the oxygen during the heating were as shown in Table 1. It was confirmed that the coating containing the FeO phase having the low electrical resistivity was formed, from an XRD pattern of the manufactured sample.

TABLE 1

| | Oxygen Partial Pressure (kPa) | Water Vapor Partial Pressure (kPa) | Nitrogen Partial Pressure (kPa) |
|---|---|---|---|
| Example 1 | 0.01 | 3.00 | 98.31 |
| Example 2 | 0.10 | 3.00 | 98.22 |
| Example 3 | 1.01 | 3.00 | 97.31 |
| Comparative Example 1 | 18.24 | 1.60 | 81.49 |
| Comparative Example 2 | 101.33 | 0 | 0 |

What is claimed is:

1. A method for manufacturing a soft magnetic member, comprising
    heating a soft magnetic alloy substrate in an atmosphere containing water vapor and inert gas to form a coating on the soft magnetic alloy substrate, wherein the coating contains $\alpha\text{-}Fe_2O_3$ and does not substantially contain another iron oxide phase,
    wherein the atmosphere has an oxygen partial pressure in a range of 0 to 0.01 kPa.

2. The method for manufacturing a soft magnetic member according to claim 1,
    wherein the inert gas is nitrogen.

3. The method for manufacturing a soft magnetic member according to claim 1,
    wherein the atmosphere has a dew point of 20 to 25° C.

* * * * *